Nov. 3, 1936.  A. A. LANE  2,059,370

VALVE SEAT MEMBER

Filed Nov. 24, 1934

Inventor
Abbot A. Lane,
By

Patented Nov. 3, 1936

2,059,370

UNITED STATES PATENT OFFICE 2,059,370

VALVE SEAT MEMBER

Abbot A. Lane, O'Hara Township, Allegheny County, Pa., assignor to Gulf Research & Development Company, Pittsburgh, Pa., a corporation of Delaware Application November 24, 1934, Serial No. 754,666

6 Claims. (Cl. 251—167)

This invention relates to valve seat members; and it comprises a double valve seat member adapted to be retained in a bored mount and having two annular single seat members, one of which fits snugly in the bore and serves as a support for the other member while the other member is in active service, and resilient packing means for the double member so disposed that any tendency of the mount to distort the support seat cannot affect or distort the active seat; all as more fully hereinafter set forth and as claimed.

Replaceable seat members for ball valves are usually made double-ended. The replaceable seat member comprises a short metal annulus usually with a load-supporting collar and having seats at each end. The member is retained in a bore in the mounting (pump housing or the like), by one of the neck portions beyond the collar, so as to expose one seat for active service. When one seat becomes worn the member is reversed end to end, bringing the other seat into use. In constructions made according to standard specifications the supporting neck portion of the double member is caused to fit tightly in the bore in the supporting mounting. If all manufacturing operations were carried out with perfect precision and if no strains were developed in installing the seat or during use, there would be no distortion on the member. As a matter of fact, the supporting bore is often not perfectly round in the first place, and distortions occur in fitting the seat member and in use. The supporting portion of the double seat member is distorted and the distortion is transmitted to the active seat portion. Distortion of the active seat causes more or less leakage of the valve. In this standard construction the amount of distortion produced by driving a seat into a slightly irregular bore may be sufficient to cause considerable leakage.

According to the invention I provide a double valve seat member of improved construction so that any distortion of the unactive portion is not communicated to the active portion. In some embodiments of the invention I do this by making the double seat member in two pieces—two annuli—and providing resilient sealing means between the pieces. In another embodiment I make the double seat member of unitary construction but provide resilient sealing means around the circumference of the member between it and the bore in the mount.

Figure 1:
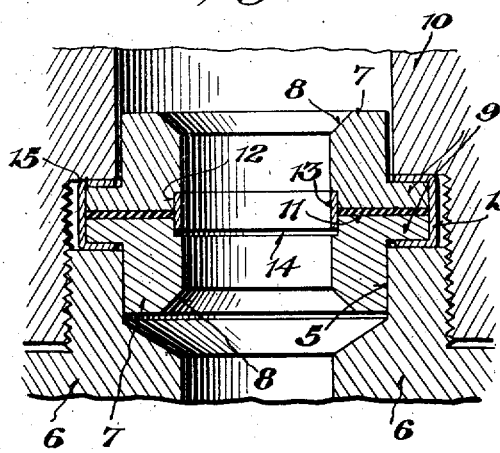
Figure 2:
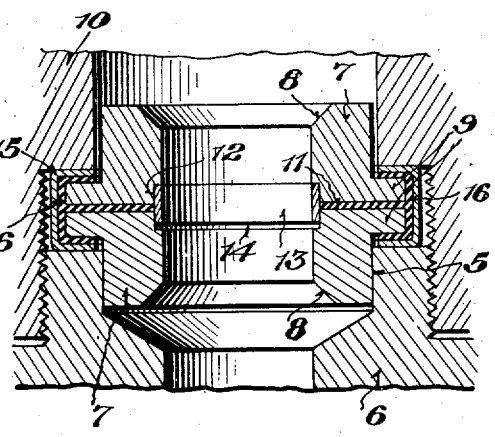
Figure 3:
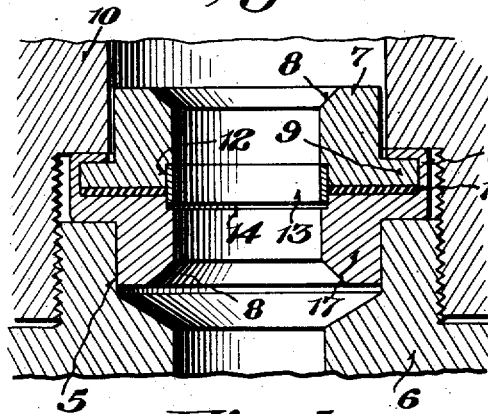
Figure 4:
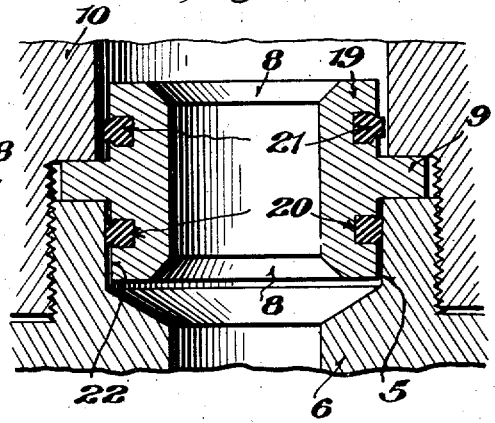
Figure 5:
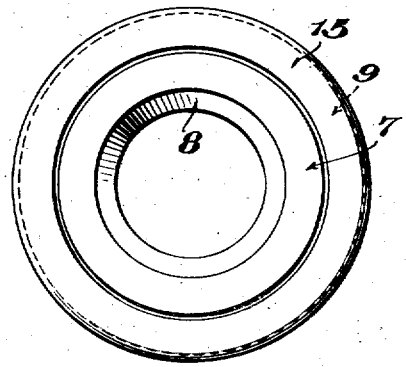

In the accompanying drawing I have shown more or less diagrammatically several forms of a specific embodiment of the invention. In these showings, Fig. 1 is a view in vertical section of a double valve seat member having resilient means between the seat members, Fig. 2 is a similar view of a modification of Fig. 1, Fig. 3 is a similar view of a modification having unitary joining means, Fig. 4 is a similar view of a unitary double member having resilient means on the circumference, and Fig. 5 is a plan view of the seat members shown in Figs. 1 to 3.

In the showing the valve seat member is in each case shown fitted into a bore 5 in a mounting member 6 which may be a portion of a pump casing, etc. The bore and the valve seat member are cylindrical. In Fig. 1 the member is shown as comprising two exactly similar necklike annular seat members 7 made of metal such as bronze or iron, or other suitable material, and each having at the outer end a seating face 8 adapted to receive a valve ball (not shown) and at the inner end a collar or flange 9. Seating face 8 may be spheroidal or conical. It is shown as being conical. The double seat member is retained in the bore as by a threaded retaining ring 10 in the pump casing etc. Stresses on the valve seat member during operation are taken on the flange. Between the two seat members is positioned a thin layer 11 of resilient gasketing or sealing material such as rubber or one of the synthetic oil-resistant rubber-like materials exemplified by "Thiokol". The inner end of each seat member is provided with a shallow annular recess 12 receiving a band or ring 13 to prevent the sealing material from flowing out from the joint under heavy pressure. In some cases this ring can be omitted, especially when sealing material of low plasticity is used. Instead of the separate ring 13, interpenetrating grooves or a slide joint can be provided on the opposed flange faces, if desired, for the same purpose. A slight free space is provided for the ring as at 14, to allow compression to take place. The two members are joined by a relatively thin metal retaining ring 15 rolled on the flanges, as shown. The ring holds the seat members together and also prevents squeezing out of the resilient material under pressure.

In practice, the double seat member is installed in the pump, etc. by pressing it into the bore 5, the dimensions being such that the fit is tight. If the bore 5 is slightly eccentric or otherwise imperfect, slight distortion of the lower seat member may occur but the upper seat member is unaffected by this distortion.

When the upper seat is worn, the double member can be reversed end to end as with ordinary members.

Fig. 2 shows a modification of the structure of Fig. 1 useful in certain installations. Additional sealing means is disposed between the flanges 9 and the retaining ring 15, as at 16, to give additional insurance against leakage.

Fig. 3 shows a modification in which the retaining ring instead of being a separate piece is integral with one of the seat members. As shown, the lower seat member 17 in this case has the flange provided with an annular extension 18 which is, before rolling, of cylindrical form. The annulus 18 can be formed on the seat member by turning or it can be a separate piece welded or brazed on. The annulus is thick enough to hold the two members firmly together but thin and resilient enough to allow slight distortion of the lower member without transmitting the distortion to the upper member. In assembling the combination the retaining band is rolled down onto the flange 9 of the upper seat member into the position shown, firmly retaining the two members and the interposed sealing means. This modification is also reversible. Additional sealing material may be provided between ring 18 and the flange of the upper seat member, if desired.

Fig. 4 shows a modification in which the double member consists of an integral cylinder 19 having two neck portions provided with two seat faces 8 and the collar or flange 9 as described for the other modifications, stresses being taken on the flange. The member is shown as provided with two annular grooves 20 in the necks on each side of the flange. More can be used if desired. Gasket rings 21 of Thiokol or similar material are set in the grooves, as shown. The gasket rings can be rolled in or otherwise fastened in place. Dimensions are such that when the seat member is pressed into place in a supporting bore the outside of the supporting seat portion has a slight clearance indicated at 22 from the mounting bore. The sealing ring is tightly compressed against the bore and firmly holds the seat member in place while protecting it from any distortion caused by imperfect figuring of the mounting bore. This seat is likewise reversible.

It is seen that in each case the active seat is protected from distortion by the bore mounting. In addition, the resilient means in each case are useful in cushioning jars and shocks produced in valve operation under certain conditions. In practical embodiments of the present invention, both the seats and the balls last much longer than standard construction. The valve operates for longer periods without development of leakage, and breakage is rare.

The invention is applicable to single-seat valves having a single seat portion and a cylindrical supporting neck. The same advantages accrue.

What I claim is:—

1. A double valve seat member adapted to be retained in a bore mount and formed of two separate annular single seat members, one of which is adapted to fit snugly in the bore and serve as a support for the other member while the other member is in active service, the two seat members being adapted to be damped together, and resilient packing means between the two members so that the active member is protected from distortion when the supporting member is subjected to distortion.

2. The matter of claim 1 wherein the two seat members are joined by an annular retainer.

3. The matter of claim 1 wherein one of the seat members is provided with an annular retaining member gripping the other seat member.

4. The matter of claim 1 wherein the two seat members are joined by an annular retainer and resilient sealing means are provided between the seat members and between the seat members and the annular retainer.

5. A double valve seat member adapted to be retained in a bore mount and formed of two separate annular single seat members having adjacent flanges, one of the seat members fitting in the bore and serving as a support for the other member, resilient packing means between the two members and a retaining ring around the flanges of the two members.

6. An annular reversible valve seat member adapted for retention in a bored mount having a flat supporting face and clamping means, said seat member comprising a two-part cylindrical body with a bore running axially therethrough, a seat at each end of said body for reception of a valve ball, one part of the body extending into the bored mount and the other being active, supporting flanges on the two parts of the cylindrical body, said flanges being juxtaposed next each other, the seat member being clamped to said bored mount by said clamping means, and an annular resilient member of easily deformable character arranged between said flanges, to prevent distortion of the active seat upon distortion of the part of the valve member which extends into the bored mount.

ABBOT A. LANE.

CERTIFICATE OF CORRECTION.

Patent No. 2,059,370.

November 3, 1936.

ABBOT A. LANE.

It is hereby certified that error appears in the printed specification of the above numbered patent requiring correction as follows: Page 2, second column, line 17, claim 1, for "damped" read clamped; and that the said Letters Patent should be read with this correction therein that the same may conform to the record of the case in the Patent Office.

Signed and sealed this 29th day of December, A. D. 1936.

(Seal)

Henry Van Arsdale
Acting Commissioner of Patents.

imperfect, slight distortion of the lower seat member may occur but the upper seat member is unaffected by this distortion.

When the upper seat is worn, the double member can be reversed end to end as with ordinary members.

Fig. 2 shows a modification of the structure of Fig. 1 useful in certain installations. Additional sealing means is disposed between the flanges 9 and the retaining ring 15, as at 16, to give additional insurance against leakage.

Fig. 3 shows a modification in which the retaining ring instead of being a separate piece is integral with one of the seat members. As shown, the lower seat member 17 in this case has the flange provided with an annular extension 18 which is, before rolling, of cylindrical form. The annulus 18 can be formed on the seat member by turning or it can be a separate piece welded or brazed on. The annulus is thick enough to hold the two members firmly together but thin and resilient enough to allow slight distortion of the lower member without transmitting the distortion to the upper member. In assembling the combination the retaining band is rolled down onto the flange 9 of the upper seat member into the position shown, firmly retaining the two members and the interposed sealing means. This modification is also reversible. Additional sealing material may be provided between ring 18 and the flange of the upper seat member, if desired.

Fig. 4 shows a modification in which the double member consists of an integral cylinder 19 having two neck portions provided with two seat faces 8 and the collar or flange 9 as described for the other modifications, stresses being taken on the flange. The member is shown as provided with two annular grooves 20 in the necks on each side of the flange. More can be used if desired. Gasket rings 21 of Thiokol or similar material are set in the grooves, as shown. The gasket rings can be rolled in or otherwise fastened in place. Dimensions are such that when the seat member is pressed into place in a supporting bore the outside of the supporting seat portion has a slight clearance indicated at 22 from the mounting bore. The sealing ring is tightly compressed against the bore and firmly holds the seat member in place while protecting it from any distortion caused by imperfect figuring of the mounting bore. This seat is likewise reversible.

It is seen that in each case the active seat is protected from distortion by the bore mounting. In addition, the resilient means in each case are useful in cushioning jars and shocks produced in valve operation under certain conditions. In practical embodiments of the present invention, both the seats and the balls last much longer than standard construction. The valve operates for longer periods without development of leakage, and breakage is rare.

The invention is applicable to single-seat valves having a single seat portion and a cylindrical supporting neck. The same advantages accrue.

What I claim is:—

1. A double valve seat member adapted to be retained in a bore mount and formed of two separate annular single seat members, one of which is adapted to fit snugly in the bore and serve as a support for the other member while the other member is in active service, the two seat members being adapted to be damped together, and resilient packing means between the two members so that the active member is protected from distortion when the supporting member is subjected to distortion.

2. The matter of claim 1 wherein the two seat members are joined by an annular retainer.

3. The matter of claim 1 wherein one of the seat members is provided with an annular retaining member gripping the other seat member.

4. The matter of claim 1 wherein the two seat members are joined by an annular retainer and resilient sealing means are provided between the seat members and between the seat members and the annular retainer.

5. A double valve seat member adapted to be retained in a bore mount and formed of two separate annular single seat members having adjacent flanges, one of the seat members fitting in the bore and serving as a support for the other member, resilient packing means between the two members and a retaining ring around the flanges of the two members.

6. An annular reversible valve seat member adapted for retention in a bored mount having a flat supporting face and clamping means, said seat member comprising a two-part cylindrical body with a bore running axially therethrough, a seat at each end of said body for reception of a valve ball, one part of the body extending into the bored mount and the other being active, supporting flanges on the two parts of the cylindrical body, said flanges being juxtaposed next each other, the seat member being clamped to said bored mount by said clamping means, and an annular resilient member of easily deformable character arranged between said flanges, to prevent distortion of the active seat upon distortion of the part of the valve member which extends into the bored mount.

ABBOT A. LANE.

---

CERTIFICATE OF CORRECTION.

Patent No. 2,059,370.

November 3, 1936.

ABBOT A. LANE.

It is hereby certified that error appears in the printed specification of the above numbered patent requiring correction as follows: Page 2, second column, line 17, claim 1, for "damped" read clamped; and that the said Letters Patent should be read with this correction therein that the same may conform to the record of the case in the Patent Office.

Signed and sealed this 29th day of December, A. D. 1936.

(Seal)

Henry Van Arsdale
Acting Commissioner of Patents.

CERTIFICATE OF CORRECTION.

Patent No. 2,059,370.　　　　　　　　　　　　　　　　　　　　November 3, 1936.

ABBOT A. LANE.

It is hereby certified that error appears in the printed specification of the above numbered patent requiring correction as follows: Page 2, second column, line 17, claim 1, for "damped" read clamped; and that the said Letters Patent should be read with this correction therein that the same may conform to the record of the case in the Patent Office.

Signed and sealed this 29th day of December, A. D. 1936.

(Seal)　　　　　　　　　　　　　　　　　　　　　　Henry Van Arsdale
　　　　　　　　　　　　　　　　　　　　　　　Acting Commissioner of Patents.